(12) United States Patent
Engl et al.

(10) Patent No.: US 7,173,993 B2
(45) Date of Patent: Feb. 6, 2007

(54) METHOD FOR SAMPLING PHASE CONTROL

(75) Inventors: Bernhard Engl, Miesbach (DE); Peter Gregorius, München (DE)

(73) Assignee: Infineon Technologies AG, Munich (DE)

(*) Notice: Subject to any disclaimer, the term of this patent is extended or adjusted under 35 U.S.C. 154(b) by 1070 days.

(21) Appl. No.: 10/219,275

(22) Filed: Aug. 16, 2002

(65) Prior Publication Data

US 2003/0142770 A1    Jul. 31, 2003

(30) Foreign Application Priority Data

Jan. 30, 2002  (DE) .............................. 102 03 596

(51) Int. Cl.
*H04L 7/00*     (2006.01)
*H03D 3/24*     (2006.01)

(52) U.S. Cl. ....................... 375/355; 375/376

(58) Field of Classification Search ............... 375/355, 375/371, 373–376; 327/156
See application file for complete search history.

(56) References Cited

U.S. PATENT DOCUMENTS

| | | | |
|---|---|---|---|
| 4,137,427 A | 1/1979 | Choquet et al. | |
| 4,376,309 A | 3/1983 | Fenderson et al. | |
| 6,985,549 B1* | 1/2006 | Biracree et al. ............ | 375/355 |
| 2002/0009167 A1 | 1/2002 | Farjad-Rad | |
| 2002/0044618 A1* | 4/2002 | Buchwald et al. .......... | 375/355 |
| 2003/0123591 A1* | 7/2003 | Walker ....................... | 375/355 |

FOREIGN PATENT DOCUMENTS

| | | |
|---|---|---|
| WO | 00/11830 | 3/2000 |
| WO | 02/091582 | 11/2002 |

OTHER PUBLICATIONS

*A 155-MHz Clock Recovery Delay-and Phase-Locked Loop*, Thomas Lee and John F. Bulzacchelli, IEEE JSSC, vol. 27, No. 12, Dec. 1992, pp. 1736-1746.
*A 30-MHz Hybrid Analog/Digital Clock Recovery in 2-µCMOS*, Beomsup Kim, David N. Helman and Paul R. Gray, IEEE JSSC, vol. 25, No. 6, Dec. 1990, pp. 1385-1394.
(3) *Clock Recovery from Random Binary Signals*, J.D.H. Alexander, Electronics Letters, Oct. 1975, vol. 11, No. 22, pp. 541-542.

* cited by examiner

*Primary Examiner*—Don N. Vo
(74) *Attorney, Agent, or Firm*—Greenblum & Bernstein, P.L.C.

(57) ABSTRACT

Method for sampling phase control for clock and data recovery of a data signal includes sampling a received data signal with a first sampling signal comprising equidistant sampling pulses, minimizing phase deviation between the first sampling signal and the phase of the received data signal to generate an adjusted second sampling signal, and sampling the received data signal with the adjusted second sampling signal to generate sampling data values. The method also includes integrating the sampling data values of the sampled data signal to form a summation value, and altering the phase of sampling pulses of the adjusted second sampling signal until the integrated summation value exceeds a threshold value that can be set.

34 Claims, 7 Drawing Sheets

METHOD FOR SAMPLING PHASE CONTROL

CROSS-REFERENCE TO RELATED APPLICATION

The present application claims priority under 35 U.S.C. §119 of German Patent Application No. 102 03 596.2, filed on Jan. 30, 2002, the disclosure of which is expressly incorporated by reference herein in its entirety.

BACKGROUND OF THE INVENTION

The invention relates to a method for sampling phase control for the clock and data recovery of a data reception signal.

DESCRIPTION OF BACKGROUND INFORMATION

As illustrated in FIG. 1, data are transmitted from a transmitter S to a receiver E via a transmission medium. The transmitter S contains a data signal generator G for generating data signals which are transmitted to the receiver via the transmission medium with the transfer function $H(\omega)$. In this case, data are transmitted from the transmitter S to the receiver via an optical medium such as, for example, optical fiber, by radio (for example wireless LAN) via an arbitrary data cable, printed circuit board lines or plug connections. In this case, the aforementioned transmission media can also be combined in an arbitrary manner, with the result that the transfer function $H(\omega)$ of the transmission medium is largely unknown in many applications. In order to avoid reflections, the transmitter acquires a matching impedance $Z_{TX}$ and the receiver E a terminating impedance $Z_{RX}$. The increasing data transmission rates are accompanied by rising technical requirements made of the transceiver modules with regard to the data processing speed thereof and the permissible bit error rate BER. In this case, data are transmitted in the gigahertz frequency range particularly in the case of transceiver modules.

The line impedance $Z_L$ of the transmission medium depends greatly on the respective application. In the case of connections between two chips, generally relatively short signal transmission paths can be assumed which, as a rule, are shorter than 40 cm. In the case of this application, the transmission medium includes electrical conductor tracks on a multilayer PCB and the corresponding plated-through holes from the housing of the transceiver module to the conductor tracks. In frequency ranges above 1 gigahertz, there occur skin effects, amplitude reductions, crosstalk, and generally distortions due to a nonlinear phase behavior of the transmission medium. In contrast to a cable-conducted data transmission, an amplitude/phase response to the root of the frequency characteristic or a linear-phase Bessel characteristic of the channel can no longer be assumed in the case of a transmission channel of this type. In applications of this type, in particular reflections and resonances due to parasitic capacitances, resistances and inductances lead to very different transmission characteristics depending on the construction of the transmission path. Such chip-to-chip data links are characterized by reflections and a few resonance points.

FIG. 2 shows a typical frequency characteristic of the complex impedance $Z_L$ of a transmission path. The impedance profile is slightly wavy, the waves being a consequence of the reflections that occur. Furthermore, in the example illustrated, the line impedance $Z_L$ contains a resonance point on account of parasitic capacitances and inductances, at which the complex impedance $Z_L$ of the transmission medium falls greatly in places.

In the case of a transmission channel characteristic of this type, it is generally not possible to match the characteristic impedance in the transmitter S and in the receiver E by the matching impedances $Z_{TX}$, $Z_{RX}$. The received data pulses of the transmitted data signal are distorted to a very great extent by a nonlinear phase profile, i.e. non-constant group delay time, by intersymbol interference, i.e. superpositions of impulse responses at the receiver end, and by reflections. By providing a simple feedforward equalizer within a receiver E, it is possible in this case to reduce only the influence of the intersymbol interference (ISI), but not the influence of the reflections that occur.

One measure of the quality of the data transmission is the so-called eye diagram. In the eye diagram, the signal pulses of the received data signal are superposed to produce an "eye." The eye diagram makes it possible to represent the quality of the received pulse and, consequently, the influences by the transmission channel.

FIG. 3 shows a simple eye diagram. The temporal profile, namely a UI (Unit Interval, i.e. duration of a signal pulse or half data period) is plotted on the x-axis and the amplitude of the received data signal is plotted on the y-axis. In the case of an ideal transmission channel, the eye is sufficiently open both in the x-direction and in the y-direction, so that data recovery is possible without difficulty at the receiver E end. In the case of a real transmission channel, however, the eye diagram is correspondingly narrowed both in the x-direction (by so-called edge jitter) and in the y-direction (by so-called amplitude jitter).

A distinction is made between non-bandwidth-limited transmission media and bandwidth-limited transmission media. Non-bandwidth-limited transmission media are fiber-optic cables, for example. In the case of such non-bandwidth-limited fiber-optic cables, however, frequency bandwidth limiting is brought about by the reception diode and the transimpedance amplifier. In bandwidth-limited transmission channels, the disturbing jitter is caused by the transmitter. In bandwidth-limited transmission media, the inherent jitter or the noise of the transmitter is additionally accompanied by the noise of the transmission channel, which leads to a further reduction of the quality of the eye diagram.

FIG. 4 shows, by way of example, an eye diagram in which the influence of a signal reflection in the transmission channel is indicated. In the example illustrated in FIG. 4, the signal reflection in the transmission channel leads to a reduction of the amplitude in the eye center. In the example illustrated, the position of the reflection is purely arbitrary and is shown centered only for illustration purposes. The narrowing, i.e. the reduction of the signal amplitude at the sampling instant, renders the recovery of the data signal more difficult compared with the eye diagram illustrated in FIG. 3. The available signal power is reduced at the sampling instant ($T_2$). This leads to a poorer signal-to-noise ratio and thus to an increase in the bit error rate.

Circuit arrangements for data recovery are also referred to as Clock & Data Recovery (CDR) circuits. For data recovery, essentially two fundamental methods are conventionally used, namely a so-called phase alignment method and a so-called phase picking method.

In the case of the phase alignment method, the sampling instant of the sampling pulse for sampling the received data signal is aligned, or controlled, with the eye center of the received data signal. The sampling pulse has an absolute phase shift of 90° with respect to the zero crossing or the signal change of the data reception signal. The phase is set by a control loop. For the data recovery and dejittering, an edge-triggered D-type flip-flop is usually used for this purpose, said flip-flop sampling the data signal present at the data input with a rising edge at the clock input.

In the case of the so-called phase picking method, the data signal is oversampled by a parallel circuit of a plurality of D-type flip-flops. A control circuit then selects the signal output of a D-type flip-flop for the data recovery in accordance with the optimum sampling instant.

The two conventional methods for data recovery can be realized in different ways in terms of circuitry. The phase alignment method and the phase picking method are described in IEEE JSSC, December 1992 pages 1736–1946, Thomas Lee: "A 155-MHz Clock Recovery Delay- and Phase Locked Loop" and in IEEE JSSC, December 1990, pages 1385–1394 by Paul R. Gray: "A 30-MHz Hybrid Analog/Digital Clock Recovery in 2-µm CMOS".

In non-bandwidth-limited transmission media or virtually non-bandwidth-limited transmission paths, the phase alignment method is generally used for data recovery.

In bandwidth-limited transmission paths with increased signal distortion, the phase picking method is normally used for data recovery.

The two basic methods for data recovery can also be combined.

FIG. 5 shows sampling of a serial data input signal, in the case of which the received data are recovered by phase alignment with oversampling. Such sampling phase control was developed by J. D. H. Alexander (see also Electronics Letter, October 1975, pages 541–542, J. D. H. Alexander: "Clock Recovery from Random Binary Signals"). FIG. 5 shows a sampling circuit with parallel-connected D-type flip-flops whose clock signal inputs receive sampling signal pulses S for sampling the serial data signal. FIG. 5 shows two eye diagrams of the serial data input signal for illustration purposes, a jitter-free data input signal in the case of an ideal transmission channel being illustrated by solid lines and a jittered data reception signal in the case of a non-ideal transmission channel being illustrated by broken lines. As can be discerned from FIG. 5, the disturbances on account of the non-ideal transmission channel lead to a highly closed eye, while the eye diagram is open wide in the case of an ideal transmission channel.

During the conventional sampling phase control, the sampling signal is synchronized, or adjusted, with the serial data input signal via a phase-locked loop. In this case, the phase deviation between the sampling signal and the phase of the received data signal is minimized. In this case, a sampling pulse (S2) is ideally synchronous with the signal edge change of the received data signal.

An essential disadvantage of the method for sampling phase control illustrated in FIG. 5 is that the received data signal is effected by the flip-flops at fixedly defined instants. The time intervals between the sampling pulses are equidistant in the case of the conventional method for sampling phase control illustrated in FIG. 5 and amount to T/8 in the example illustrated in FIG. 5, where T is the period of the received data signal.

In this case, the following holds true:

$$T = \frac{2}{DR} = \frac{1}{f_{Data}} = 2 \cdot UI$$

where DR is the data transmission rate of the received data signal; and

UI is the duration of a reception pulse.

During the sampling of a data reception pulse with only one flip-flop or sampling value, an error-free data recovery is not ensured due to the metastability of the flip-flop on account of the reduced signal-to-noise ratio brought about by reflections, noise and internal or external crosstalk. Therefore, within the duration of a reception pulse (UI), the number of sampling pulses is increased via oversampling.

Optimum sampling of the reception pulse at an ideal instant cannot be achieved on the basis of the sampling instants which are illustrated in FIG. 5 and have a rigid phase relation with respect to one another. In the example illustrated in FIG. 5, the constant sampling signal has equidistant sampling pulses which have a rigid phase difference $\Delta\phi_{fix}$ of T/8. Sampling at an ideal instant, in the case of which the signal energy of the received data signal is optimally utilized, is not effected in this case. As can be discerned from FIG. 5, by way of example, the sampling pulses $S_{11}$, $S_{12}$, $S_{31}$, $S_{32}$ lie at the edge of the highly closed eye on account of the considerable amplitude and phase jitter of the received data signal, so that sampling leads to sampling values with a very low signal energy. The decision units or flip-flops cannot generate an unambiguous output data signal at their output on account of the small signal amplitude at the sampling instants at the signal input, so that incorrect decisions arise during the sampling. The bit error rate BER is increased to a very great extent as a result of this.

SUMMARY OF THE INVENTION

The present invention provides a method for sampling phase control for the clock and data recovery of a data signal which optimally utilizes the signal energy of the data reception signal and minimizes the bit error rate during sampling.

The above feature of the present invention is achieved according to the invention by sampling a received data signal with a first sampling signal having equidistant sampling pulses; minimizing phase deviation between the first sampling signal and the phase of the received data signal to generate an adjusted second sampling signal; sampling the received data signal with the adjusted second sampling signal to generate sampling data values; integrating the sampling data values of the sampled data signal to form a summation value; and altering the phase of sampling pulses of the adjusted second sampling signal until the integrated summation value exceeds a threshold value that can be set.

The invention provides a method for sampling phase control for the clock and data recovery of a data signal having the following steps, namely sampling of the received data signal with a first sampling signal having equidistant sampling pulses, minimization of the phase deviation between the first sampling signal and the phase of the received data signal for the purpose of generating an adjusted second sampling signal, sampling of the received data signal with the second adjusted sampling signal for the purpose of generating sampling data values, integration of the sampling data values of the sampled data signal to form a summation value, and alteration of the phase of sampling pulses of the adjusted second sampling signal until the integrated summation value exceeds a threshold value that can be set.

In a feature of the method according to the invention, a detection signal is generated, which indicates the adjusted state, if the integrated summation value exceeds the threshold value that can be set.

For the adjustment of the phase of the first sampling signal, the phase deviation between the sampling signal and the received data signal is preferably evaluated by a phase evaluation arrangement and the phase of the sampling signal is altered by a main phase shifter until the phase deviation amounts to zero.

The adjusted second sampling signal preferably includes at least two temporally offset sampling pulse trains, the sampling pulses of a constant sampling pulse train having a constant time interval with respect to one another and the sampling pulses of a variable sampling pulse train having a variable time interval with respect to one another.

The received data signal may include a train of data pulses with constant data pulse duration (UI).

The time interval ($\Delta\phi_{fix}$) between the sampling pulses of the constant sampling pulse train is preferably equal to half the data pulse duration (UI/2).

In a feature of the method according to the invention, the constant sampling pulse train includes first sampling pulses, which are time-synchronous with the signal edge change of the received data signal, and second sampling pulses, which are temporally offset by half a data pulse duration (UI/2) with respect to the signal edge change of the received data signal.

In a certain feature of the method for sampling phase control according to the invention, the time interval ($\Delta\phi_{variable}$) between the sampling pulses of the variable sampling pulse train and the second sampling pulses of the constant sampling pulse train is reduced until the integrated summation value exceeds the threshold value that can be set.

A sampling data value generated by a second sampling pulse of the constant sampling pulse train and the sampling data values generated by the two adjacent sampling pulses of the variable sampling pulse train are preferably in each case applied to a multiple decision unit, which generates a logical output signal in a manner dependent on the applied sampling data values.

The logical output signals of the multiple decision units may be rectified by a rectifier.

The received data signal is may be a serial data signal.

In a feature of the method according to the invention, the serial data signal is sampled by parallel-connected flip-flops of a sampler.

The integrated summation value is compared with the threshold value preferably by a comparator.

In this case, the threshold value is preferably programmed in.

The comparator may generate a comparison output signal which is filtered by a filter connected downstream.

The integrated comparison output signal is preferably applied to secondary phase shifters, which set the variable time interval ($\Delta\phi_{variable}$) between sampling pulses of the variable sampling pulse train and the second sampling pulses of the constant sampling pulse train in a manner dependent on the filtered comparison output signal.

In a feature of the method of sampling phase control according to the invention, the logical output signals of the multiple decision units are selected by a data processing unit if the detection signal indicates the adjusted state.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
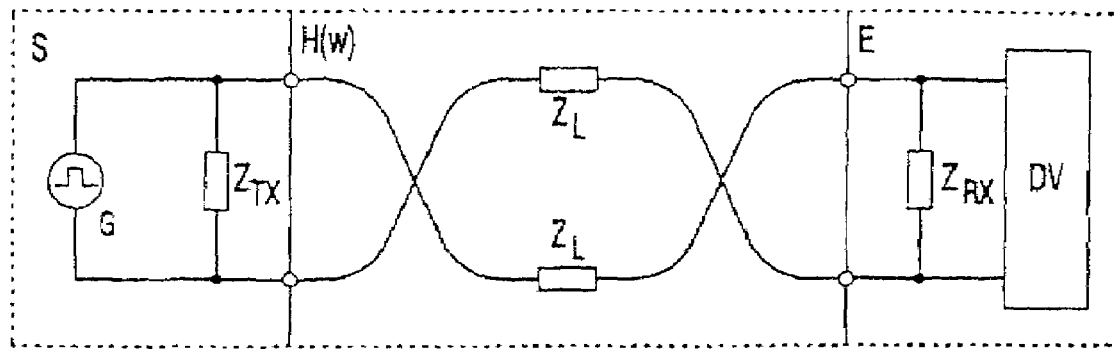
FIG. 1 shows a data transmission path according to the prior art.
Figure 2:
FIG. 2 shows a complex line impedance in the case of a real data transmission path.
Figure 3:
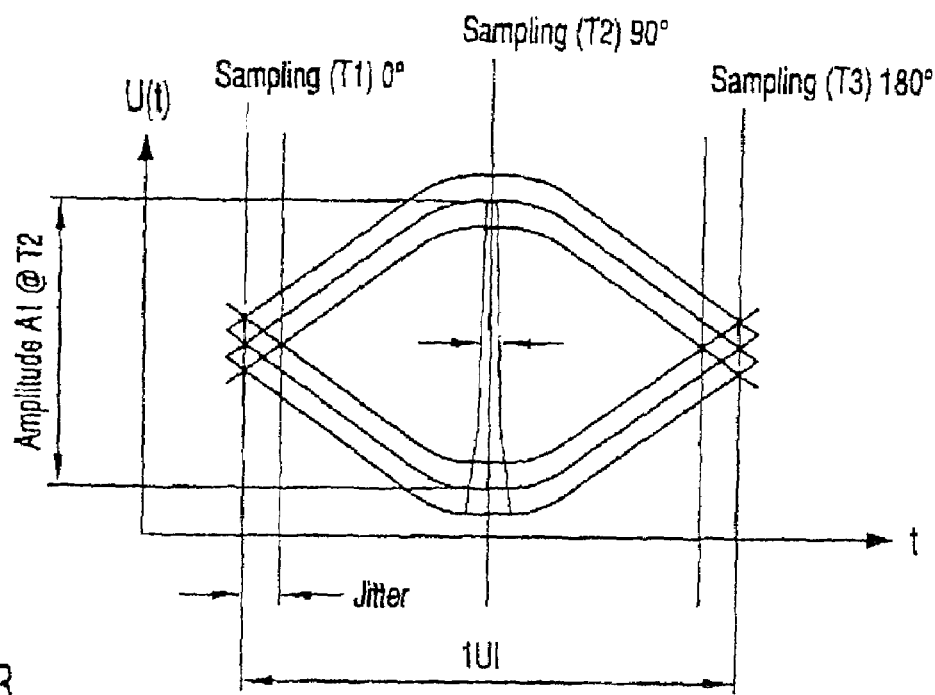
FIG. 3 shows an eye diagram of a data reception signal.
Figure 4:
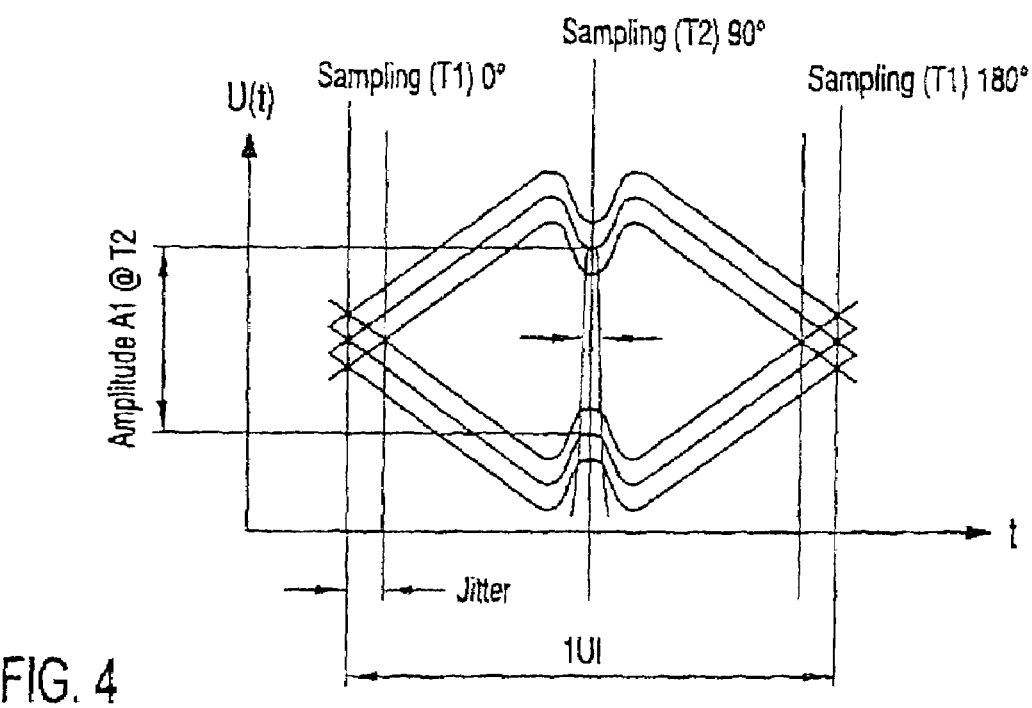
FIG. 4 shows an eye diagram of a data reception signal when reflections occur.
Figure 5:
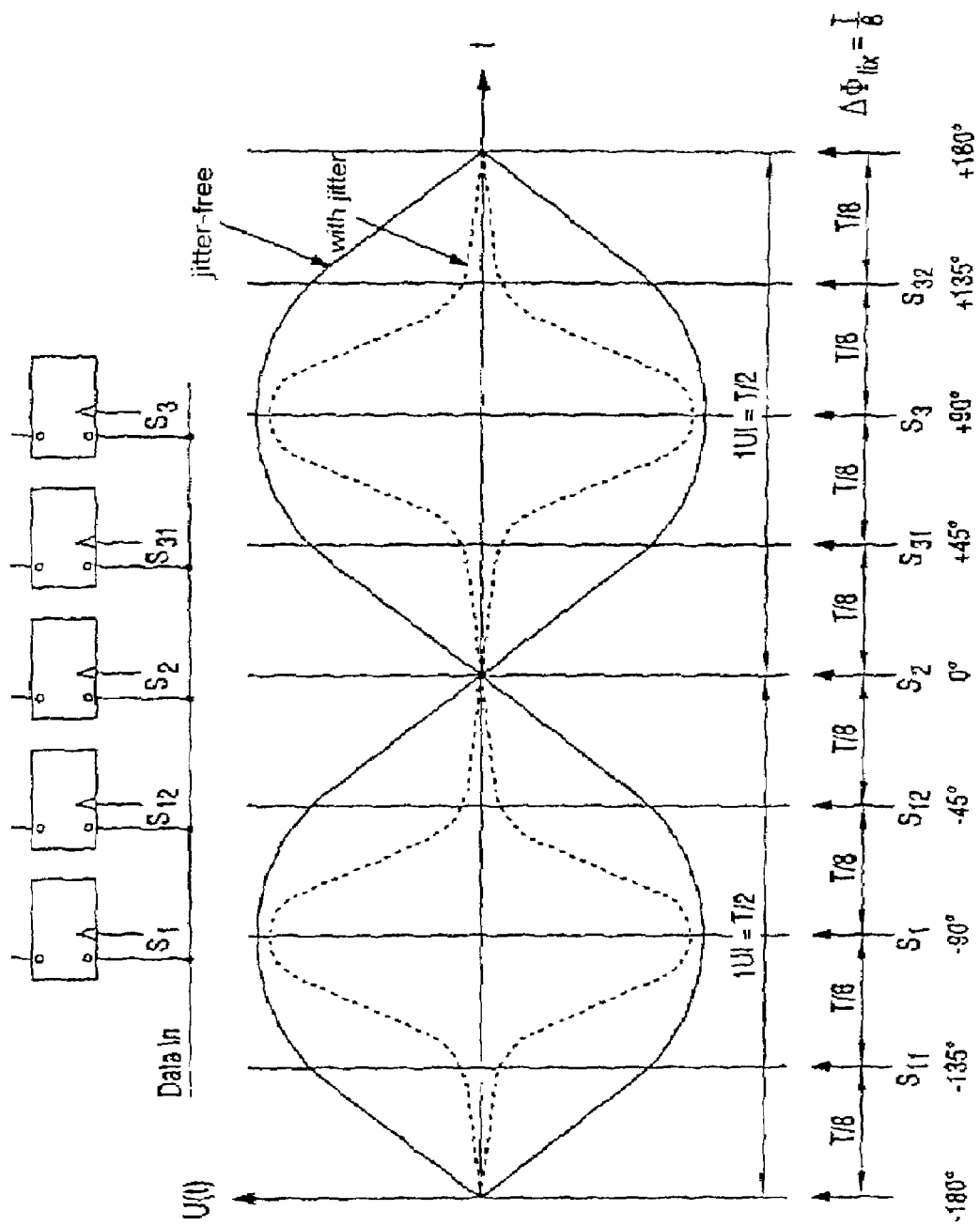
FIG. 5 shows a diagram of a conventional method for sampling phase control.
Figure 6:
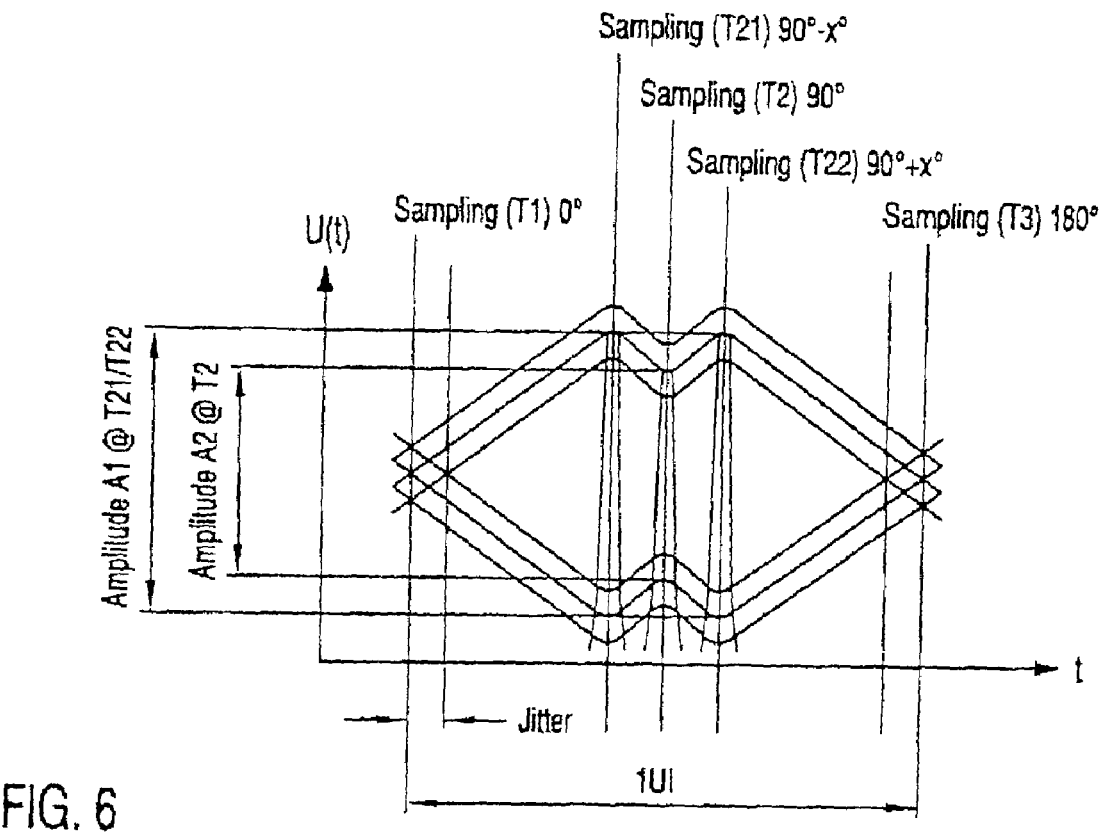
FIG. 6 shows an eye diagram for elucidating the sampling principle underlying the method according to the invention.

Referring to the drawings wherein like numerals represent like elements, FIG. 6 shows an eye diagram for elucidating the functional principle underlying the invention. Sampling of the data reception signal at the instant T2, i.e. phase-offset 90° with respect to the signal edge change, is not favorable on account of the small signal-to-noise ratio at this instant.

In the case of the method according to the invention, additional samplings are performed around the sampling instant T2 at the instants T21 and T22. In this case, the sampling instants T21, T22 are in a fixed phase relationship with the sampling instant T2. The time interval between the secondary sampling instants T21, T22 and the main sampling instant T2 is variable. A programmable phase angle of the secondary sampling instants T21, T22 ensures an optimum evaluation of the data reception signal with maximum signal power. This leads to a very low bit error rate BER.

Figure 7:
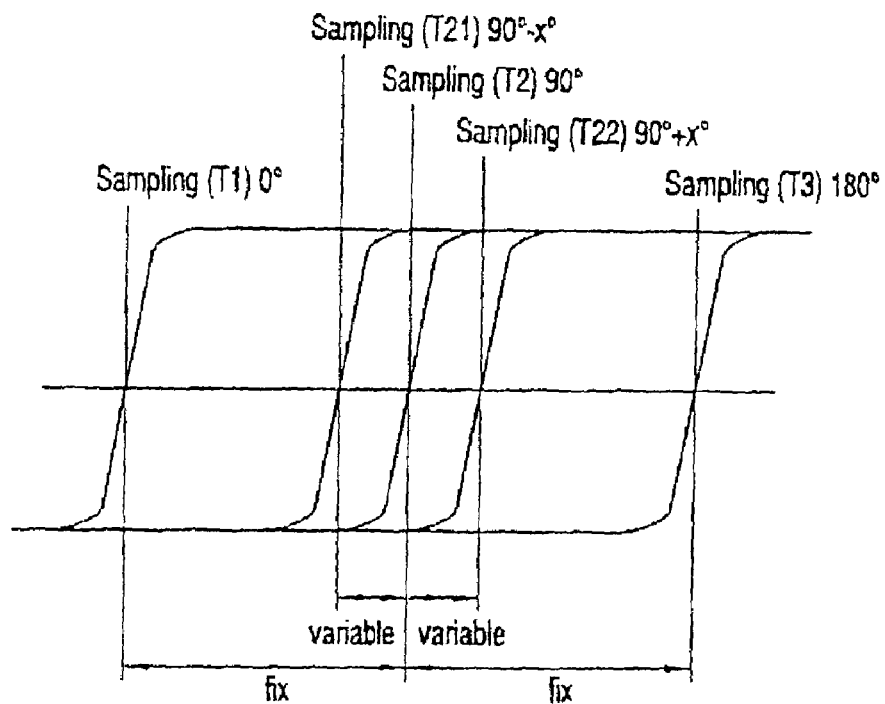
FIG. 7 shows a diagram for elucidating the mode of operation of the method for sampling control according to the invention.

In the case of sampling phase control according to the invention, as illustrated in FIG. 7, the data reception signal is sampled at the instants T1 (0°), at the instant T2 (90°) and the instant T3 (180°) in a rigid phase relation with respect to one another. The sampling pulses with which the data reception signal is sampled at the sampling instants T21 (90°−x°) and T22 (90°+x°) serve for the actual data recovery. The sampling pulses at the instants T1, T3 are provided for phase alignment of the sampling signal and are evaluated by phase detectors within the receiver.

Figure 8:
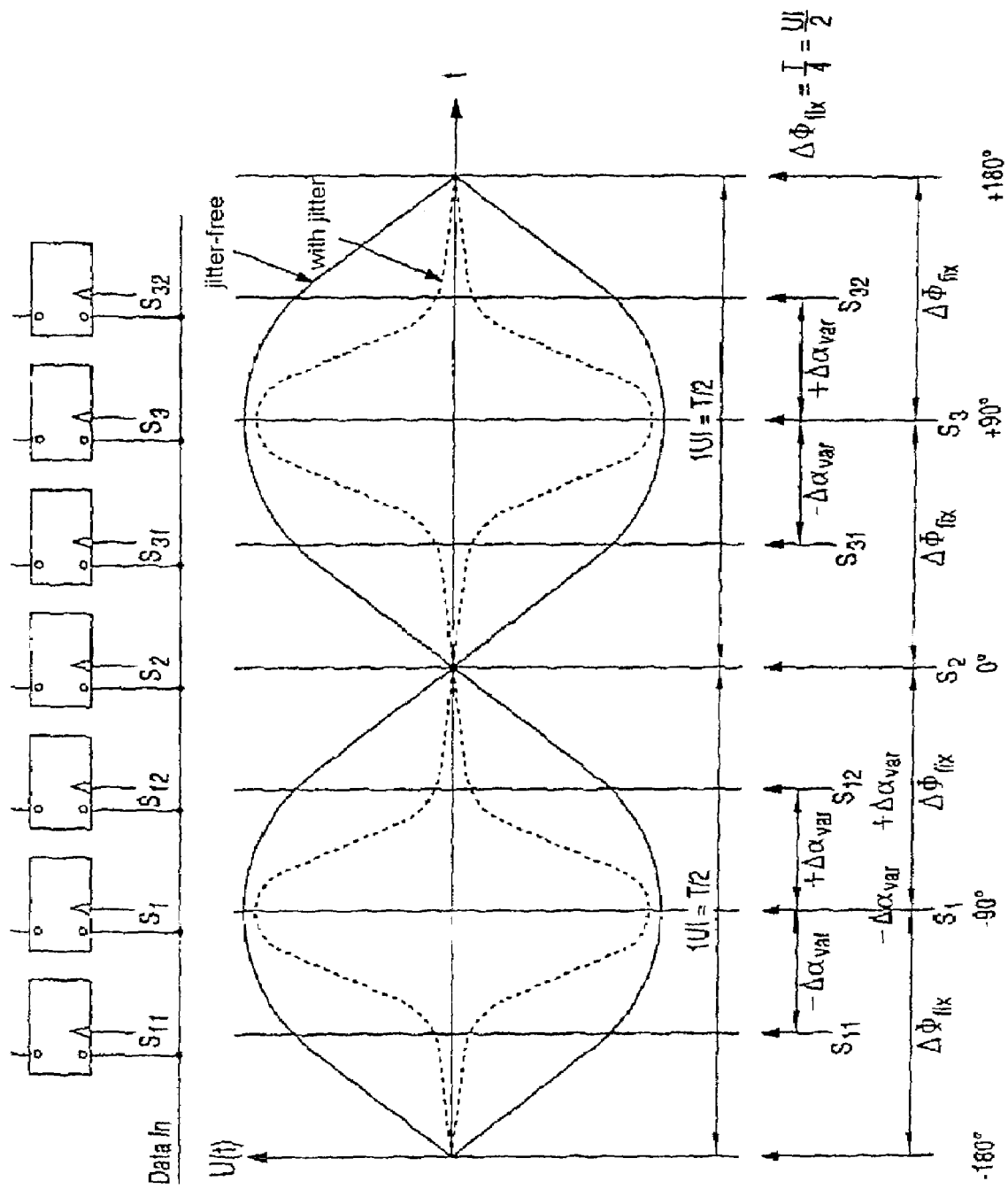
FIG. 8 shows a diagram for elucidating the mode of operation of the method for sampling phase control according to the invention.

FIG. 8 shows a diagram for elucidating the mode of operation of the sampling phase control according to the invention. The diagram shows two eye diagrams in a temporal sequence, which each have the duration of a reception pulse, i.e., half the data transmission period T. In the diagram, the solid line shows an eye diagram in the case of an ideal data transmission channel, while the broken line illustrates a highly noisy eye in the case of a non-ideal transmission channel.

FIG. 8 shows the situation after the sampling signal has already been adjusted to the received data signal. In this case, the sampling pulse S2 is time-synchronous with the signal edge change of the data reception signal. The adjusted sampling signal, as is illustrated in FIG. 8, includes at least two temporally offset sampling pulse trains. The sampling pulses (S1, S2, S3) of a constant sampling pulse train have a constant time interval ($\Delta\phi_{fix}$) with respect to one another. By contrast, the sampling pulses ($S_{11}$, $S_{12}$, $S_{31}$, $S_{32}$) of a variable sampling pulse train have a variable time interval with respect to one another and with respect to the sampling pulses of the constant sampling pulse train S1, S2, S3. The time interval for the phase spacing ($\Delta\phi_{variable}$) between the sampling pulses of the variable sampling pulse train and the sampling pulses of the constant sampling pulse train can be set or programmed in a variable manner depending on the data reception signal.

The greater the extent to which the eye diagram of the data reception signal is closed, i.e., the greater the disturbances brought about by the transmission channel, the nearer the sampling pulses of the variable sampling pulse train are brought to the associated sampling pulse of the constant sampling pulse train. By way of example, the variable phase difference ($\Delta\phi_{variable}$) between the sampling pulses $S_{11}$, $S_{12}$ of the variable sampling pulse train and the sampling pulse $S_1$ of the constant sampling pulse train is reduced if the eye diagram closes to a noticeably greater extent, i.e. the amplitude and phase jitter increases. The shift in the sampling pulses $S_{11}$, $S_{12}$, $S_{31}$, $S_{32}$ in dependence on the data reception signal enables sampling with maximum power assessment of the data reception signal, i.e. with maximum utilization of the signal energy of the data reception signal.

The data reception signal (Data In) is sampled by a plurality of decision units or flip-flops which are connected in parallel with one another and are clocked by the temporally offset sampling pulses. The sampling data present at the output Q of the flip-flops are fed to multiple decision units or a phase evaluation circuit.

Figure 9:
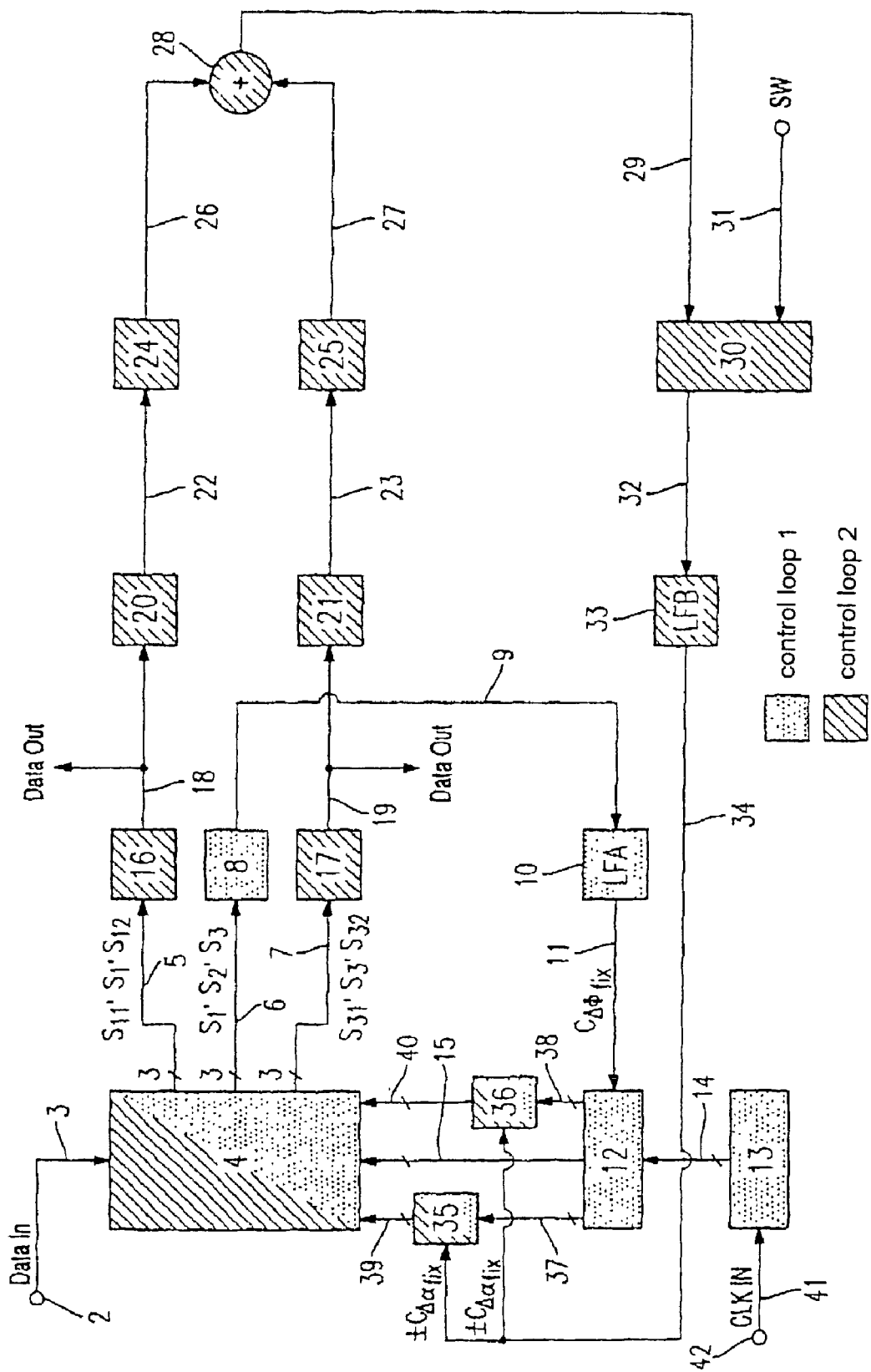
FIG. 9 shows a block diagram of a sampling phase control circuit according to the invention.

FIG. 9 shows a block diagram of a sampling phase control circuit according to the invention. The sampling phase control circuit 1 receives a serial data input signal via a data input 2. The received serial data input signal (Data In) is fed to a sampler 4 via an internal line 3. By way of example, as illustrated in FIG. 8, the sampler 4 includes a plurality of flip-flops which are connected in parallel with one another. The data values sampled by the sampling pulses ($S_1$) are output by the signal outputs (Q) of the flip-flops of the sampler 4 via data line buses 5, 6, 7.

The sampling data values of S1, S2, S3 which are generated by the constant sampling pulse train with equidistant sampling pulses are fed to a phase evaluation circuit 8. On the output side, the phase evaluation circuit 8 is connected to a digital loop filter 10 via a line 9. A main phase shifter circuit 12 is connected to the digital loop filter 10 via a line 11.

The sampling phase control circuit 1 contains a multiphase generator 13, which is a delay-locked loop DLL or a phase-locked loop PLL. The input clock CLK IN is fed to the multiphase generator at the data input 42 via the signal line 41. The multiphase generator 13 generates a multiphase signal which is applied to the main phase shifter 12 via an internal signal bus 14. The main phase shifter 12 carries out a phase shift of the generated multiphase signal in a manner dependent on the filtered output signal of the phase evaluation circuit 8. On the output side, the main phase shifter 12 is connected to the sampler 4 via a signal bus 15. The main phase shifter 12 outputs, via the signal line 15, the sampling pulses for generating the sampling data values or samples S1, S2, S3 to the clock inputs of the associated flip-flop within the sampler 4.

The sampler 4, the phase evaluation circuit 8, the digital filter 10 connected downstream and also the main phase shifter 12 together form a phase-locked loop (control loop 1), which ensures that the sampling signal is adjusted to the phase of the received data input signal Data In. In this case, the phase deviation between the sampling signal and the phase of the received data signal is minimized for the purpose of generating an adjusted sampling signal. In the adjusted state of the sampling signal, the sampling instant is exactly time-synchronous with the signal edge change of the data reception signal.

The sampling data value S11, S1, S12 form a group of sampling data values and are fed to a multiple decision circuit 16 via the data line 5. In the same way, the sampling data values S31, S3, S32 form a second group and are fed to a further multiple decision unit 17 via the data lines 7. The multiple decision units 16, 17 can be implemented for example as a combined logic circuit. The multiple decision units 16, 17 are preferably designed in such a way that at least two sampling data values $S_i$ have the same state or logical data value, in order that the multiple decision unit outputs a corresponding data value at its output. The outputs of the multiple decision units 16, 17 are respectively connected to downstream rectifiers 20, 21 via a line 18, 19. Summers 24, 25 are connected downstream of the rectifiers 20, 21 on the output side via lines 22, 23. The outputs of the summers 24, 25 are connected via lines 26, 27 to an adder 28, which adds the signals present and outputs the result to a comparator circuit 30 via a line 29. The data values output by the multiple decision units 16, 17 are summed by the summers 24, 25 and subsequently added by the adder 28 to form a summation value. The two summers 24, 25 and the adder 28 thus add the sampling data values output by the multiple decision unit 16, 17 to form a summation value.

The summation value present on the line 29 is compared with a threshold value SW, present on a line 31, by the comparator circuit 30. The threshold value SW is either applied externally or is programmed into the sampling control circuit. The comparator 30 generates a comparison output signal which is output via a line 32 to a digital loop filter 33 connected downstream. The filtered output signal is used, via lines 34, for setting secondary phase shifters 35, 36. On the input side, the secondary phase shifters 35, 36 are connected to the main phase shifter 12 via signal lines 37, 38. The secondary phase shifters 35, 36 shift the phase angle of the sampling pulses for the sampling data values $S_{11}$, $S_{12}$, $S_{31}$, $S_{32}$ and output these phase-shifted sampling pulses via lines 39, 40 to the corresponding sampling flip-flops within the sampler 4.

The multiple decision units 16, 17, the rectifiers 20, 21, the integration device 24, 25, 28, the comparator 30 and the digital loop filter 33 connected downstream form, together with the secondary phase shifters 35, 36, a maximum value control loop (control loop 2) within the sampling phase control circuit 1. The maximum value control loop aligns the sampling pulses for the sampling data values $S_{11}$, $S_{12}$, $S_{31}$, $S_{32}$ in a manner dependent on the form or the eye diagram of the data reception signal, so that the data reception signal is sampled at optimum instants by the sampler.

The multiple decision units 16, 17 ensure reliable sampling of the data reception signal. Since the sampling instants for the additional sampling data values $S_{11}$, $S_{12}$, $S_{31}$, $S_{32}$ can be set in a variable manner, the bit error rate BER can be optimized, depending on signal waveform, without requiring oversampling of the data reception signal. This makes it possible to minimize the circuitry outlay of the sampling phase control circuit 1.

Figure 10:
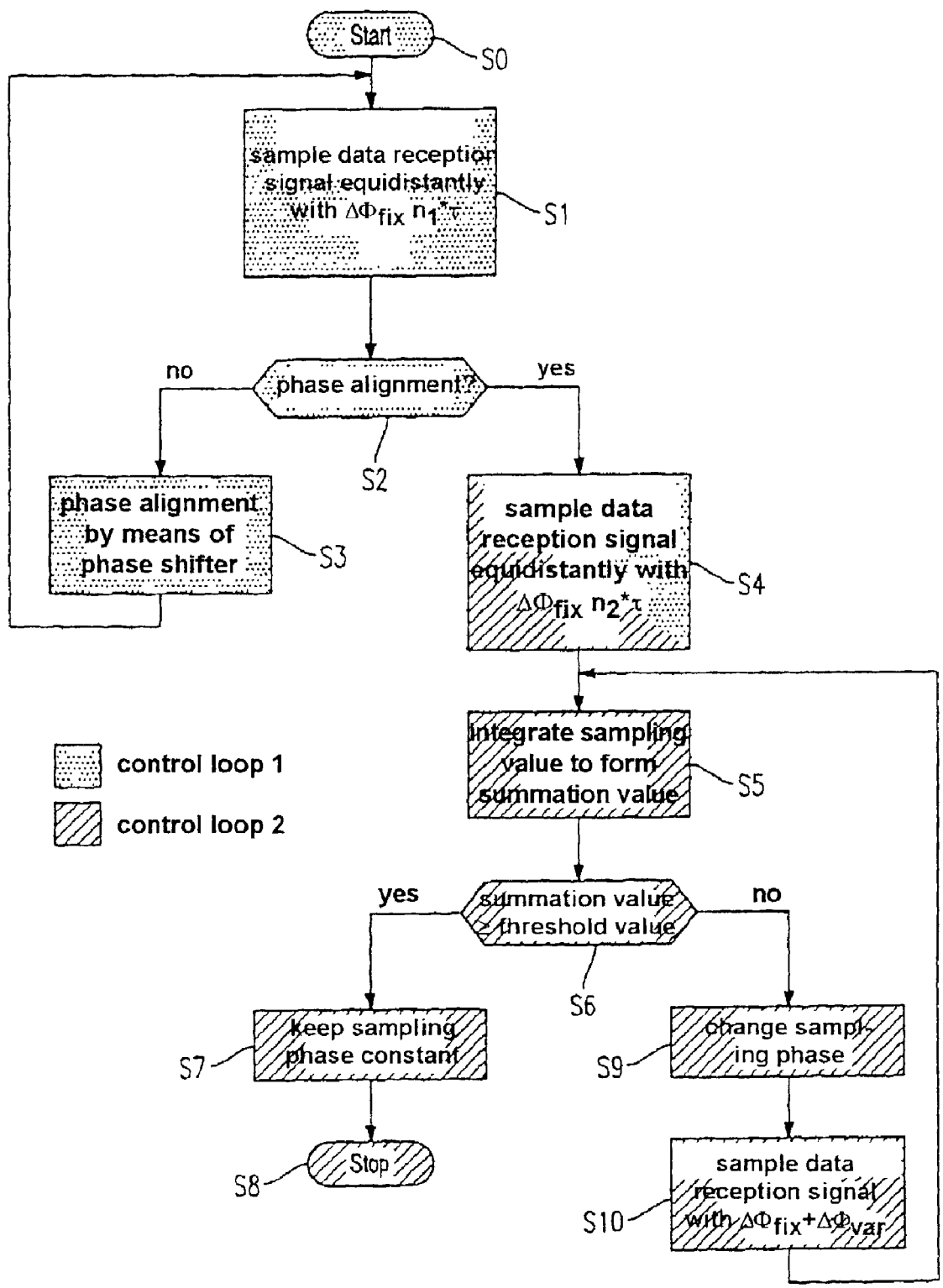
FIG. 10 shows a flow diagram of an embodiment of the method for sampling phase control according to the invention.

FIG. 10 shows a flow diagram of the preferred embodiment of the sampling method according to the invention.

After a start step $S_0$, the data reception signal Data In present at the signal input 2 is firstly sampled equidistantly with a first sampling signal, has equidistant sampling pulses, over a predetermined time duration $zD1=n_1 \cdot T$ in a step S1.

In a step S2, a check is made to determine whether or not a phase alignment has been reached. A phase alignment is present if the sampling data pulse for the sampling data value $S_2$ is exactly time-synchronous with the signal edge change of the received data signal Data In. In the adjusted state of the sampling signal, the sampling data value $S_2$ is exactly zero.

If the interrogation in S2 reveals that phase alignment of the sampling signal has not yet been effected, the phase alignment is carried out in step S3 and the procedure returns to step S1. The phase alignment in step S3 is effected via the phase-locked loop of the sampling phase control circuit 1, i.e. via the phase evaluation circuit 8, downstream-connected digital filter 10 and the main phase shifter 12.

After the phase deviation between the sampling signal and the phase of the received data signal has been minimized in the phase-locked loop of steps S1 to S3, the data reception signal is sampled anew over a predetermined time duration $zD2=n_2 \cdot T$ in a step S4.

In this case, it holds that $n_2=k \times n_1$, where $k \geq 1$ and k may be 10, for example.

In a step S5, the sampling data values are evaluated by the multiple decision units 16, 17, the output data values of the multiple decision units 16, 17 then preferably being rectified. Finally, the sampling data values are integrated by the summers 24, 25 and the adder 28 to form a summation value and applied to the comparator 30.

In a step S6, the integrated summation value is compared with the threshold value SW that can be set by the comparator 30.

If the summation value is greater than or equal to the threshold value SW, the sampling phase $\Delta\phi_{variable}$ of the sampling data values $S_{11}$, $S_{12}$, $S_{31}$, $S_{32}$ is kept constant in a step S7 and the method is ended in step S8. Conversely, if it is ascertained by the comparator 30 that the summation value lies below the threshold value SW that can be set, the sampling phase $\Delta\phi_{variable}$ of the sampling data values $S_{11}$, $S_{12}$, $S_{31}$, $S_{32}$ is changed in step S9. In step S9, the sampling phase of the sampling signal is adapted or optimized to the signal waveform of the data reception signal. In this case, the phase spacing between the sampling values $S_{11}$, $S_{12}$ and the sampling pulse $S_1$ of the equidistant sampling pulse train or the phase difference between the sampling pulses $S_{31}$, $S_{32}$ and the sampling pulse $S_3$ is reduced the smaller the eye diagram is or the larger the amplitude and phase jitter are.

After the fine alignment of the sampling instants has been effected in step S9, the data reception signal is sampled anew in step S10. The maximum value control of steps S5, S6, S9, S10 is effected until the summation value exceeds the threshold value in step S6 and the sampling phase control is concluded.

If the integrated summation value exceeds the threshold value SW in step S6, a detection signal indicating the adjusted state is preferably generated. After successful conclusion of the sampling phase control, the data present at the signal outputs of the multiple decision units 16, 17 are read out for further data processing (Data Out).

In the case of the method illustrated in FIG. 8, only two additional sampling data values ($S_{11}$, $S_{12}$ or $S_{31}$, $S_{32}$) are generated for data recovery purposes. The number of additional sampling data values can be increased further in alternative embodiments of the sampling method according to the invention.

The method according to the invention can be realized in diverse ways in terms of circuitry. The method according to the invention is suitable in particular for multichannel SERDES modules for data transmission in a relatively highly noisy application environment and for large scale integration with additional signal processing units, in particular in the WAN/LAN area. Furthermore, the method according to the invention can be used for data transmission between storage media within computer-aided applications.

The method according to the invention is particularly suitable for data transmission rates lying above a frequency range of 1 gigahertz.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for sampling phase control for clock and data recovery of a data signal, comprising:
   (a) sampling a received data signal with a first sampling signal comprising equidistant sampling pulses;
   (b) minimizing phase deviation between the first sampling signal and the phase of the received data signal to generate an adjusted second sampling signal;
   (c) sampling the received data signal with the adjusted second sampling signal to generate sampling data values;

(d) integrating the sampling data values of the sampled data signal to form a summation value; and (e) altering the phase of sampling pulses of the adjusted second sampling signal until the integrated summation value exceeds a threshold value that can be set.

2. The method according to claim 1, further comprising generating a detection signal if the integrated summation value exceeds the threshold value that can be set, the detection signal indicating the adjusted state.

3. The method according to claim 1, wherein said minimizing comprises:

evaluating, by a phase evaluation circuit, the phase deviation between the first sampling signal and the received data signal; and altering, by a main phase shifter, the phase of the first sampling signal until the phase deviation reaches approximately zero.

4. The method according to claim 1, wherein the adjusted second sampling signal comprises at least two temporally offset sampling pulse trains, the method further comprising:

sampling pulses of a constant sampling pulse train having a substantially constant time interval with respect to one another; and sampling pulses of a variable sampling pulse train having a variable time interval.

5. The method according to claim 1 wherein the received data signal comprises a train of data pulses with substantially constant data pulse duration.

6. The method according to claim 4, wherein the time interval between the sampling pulses of the constant sampling pulse train is equal to approximately half the data pulse duration.

7. The method according to claim 4, wherein in the adjusted state of the second sampling signal, the constant sampling pulse train comprises:

first sampling pulses which are time-synchronous with the signal edge change of the received data signal; and second sampling pules which are temporally offset by approximately half of a data pulse duration with respect to the signal edge change of the received data signal.

8. The method according to claim 4, further comprising reducing the time interval between the sampling pulses of the variable sampling pulse train and the second sampling pulses of the constant sampling pulse train, until the integrated summation value exceeds the threshold value that can be set.

9. The method according to claim 7, further comprising:

applying, to a multiple decision unit, a said sampling data value generated by a second sampling pulse of the constant sampling pulse train and the sampling data values generated by two adjacent sampling pulses of the variable sampling pulse train; and generating, via the multiple decision unit, a logical output signal dependent on the applied sampling data values.

10. The method according to claim 9, further comprising rectifying the logical output signals of the multiple decision units.

11. The method according to claim 5, wherein the received data signal is a serial data signal.

12. The method according to claim 11, further comprising sampling the serial data signal by parallel-connected flip-flops.

13. The method according to claim 1, further comprising comparing the integrated summation value with the threshold value.

14. The method according to claim 1, further comprising programming in the threshold value.

15. The method according to claim 13, further comprising:

generating a comparison output signal; and filtering the generated comparison output signal.

16. The method according to claim 7, further comprising:

comparing the integrated summation value with the threshold value;

generating a comparison output signal;

filtering the generated comparison output signal;

applying the filtered comparison output signal to secondary phase shifters; and setting, via the secondary phase shifters, the variable time interval between sampling pulses of the variable sampling pulse train and the second sampling pulses of the constant sampling pulse train, the setting dependent on the filtered comparison output signal.

17. The method according to claim 9, further comprising selecting the logical output signals of the multiple decision units by a data processing unit if the detection signal indicates the adjusted state.

18. A sampling phase control circuit for clock and data recovery of a data signal, comprising:

a sampler configured to sample a received data signal with a first sampling signal, the first sampling signal having equidistant sampling pulses;

a phase-locked loop configured to minimize phase deviation between the first sampling signal and the phase of the received data signal to generate an adjusted second sampling signal, said sampler being further configured to sample the received data signal with the adjusted second sampling signal to generate sampling data values; and a summer and an adder configured to integrate the sampling data values of the sampled data signal to form a summation value, wherein said sampler is further configured to alter the phase of sampling pulses of the adjusted second sampling signal until the integrated summation value exceeds a threshold value that can be set.

19. The circuit according to claim 18, further comprising a comparator configured to generate a detection signal if the integrated summation value exceeds the threshold value that can be set, wherein detection signal indicates the adjusted state.

20. The circuit according to claim 18, wherein said phase-locked loop comprises:

a phase evaluation circuit configured to evaluate the phase deviation between the first sampling signal and the received data signal; and a main phase shifter configured to alter the phase of the first sampling signal until the phase deviation reaches approximately zero.

21. The circuit according to claim 18, wherein:

the adjusted second sampling signal includes at least two temporally offset sampling pulse trains;

said sampler is further configured to:

sample pulses of a constant sampling pulse train having a substantially constant time interval with respect to one another; and sample pulses of a variable sampling pulse train having a variable time interval.

22. The circuit according to claim 18 wherein the received data signal comprises a train of data pulses with substantially constant data pulse duration.

23. The circuit according to claim 21, wherein the time interval between the sampling pulses of the constant sampling pulse train is equal to approximately half the data pulse duration.

24. The circuit according to claim 21, wherein in the adjusted state of the second sampling signal, the constant sampling pulse train comprises:
first sampling pulses which are time-synchronous with the signal edge change of the received data signal; and
second sampling pulses which are temporally offset by approximately half of a data pulse duration with respect to the signal edge change of the received data signal.

25. The circuit according to claim 21, wherein said sampler is further configured to reduce the time interval between the sampling pulses of the variable sampling pulse train and the second sampling pulses of the constant sampling pulse train, until the integrated summation value exceeds the threshold value that can be set.

26. The circuit according to claim 24, further comprising a multiple decision unit, wherein:
said sampler is further configured to apply, to said multiple decision unit, a said sampling data value generated by a said second sampling pulse of the constant sampling pulse train and the sampling data values generated by two adjacent sampling pulses of the variable sampling pulse train; and
said multiple decision unit is configured to generate a logical output signal dependent on the applied sampling data values.

27. The circuit according to claim 25, further comprising a rectifier configured to rectify the logical output signals of said multiple decision unit.

28. The circuit according to claim 22, wherein the received data signal is a serial data signal.

29. The circuit according to claim 28, wherein said sampler is further configured to sample the serial data signal by parallel-connected flip-flops.

30. The circuit according to claim 18, further comprising a comparator configured to compare the integrated summation value with the threshold value.

31. The circuit according to claim 18, wherein the threshold value is programmed.

32. The circuit according to claim 30, further comprising a filter, wherein:
said comparator is further configured to generate a comparison output signal; and
said filter is configured to filter the generated comparison output signal.

33. The circuit according to claim 24, further comprising:
a comparator configured to compare the integrated summation value with the threshold value, and generate a comparison output signal;
a filter configured to filter the generated comparison output signal;
a secondary phase shifter, said comparator configured to apply the filtered comparison output signal to secondary phase shifters, said secondary phase shifter configured to set the variable time interval between sampling pulses of the variable sampling pulse train and the second sampling pulses of the constant sampling pulse train, the setting dependent on the filtered comparison output signal.

34. The circuit according to claim 26, further comprising a data processing unit configured to select the logical output signal of said multiple decision unit, if the detection signal indicates the adjusted state.

* * * * *